US011964312B2

(12) United States Patent
Saari

(10) Patent No.: US 11,964,312 B2
(45) Date of Patent: Apr. 23, 2024

(54) SYSTEM AND METHOD FOR REMOVING MATERIAL BUILD-UP IN MIXING CHAMBER OF ROTARY MIXER MACHINE

(71) Applicant: Caterpillar Paving Products Inc., Brooklyn Park, MN (US)

(72) Inventor: Jacob Matthew Saari, Elk River, MN (US)

(73) Assignee: Caterpillar Paving Products Inc., Brooklyn Park, MN (US)

(*) Notice: Subject to any disclaimer, the term of this patent is extended or adjusted under 35 U.S.C. 154(b) by 701 days.

(21) Appl. No.: 17/120,437

(22) Filed: Dec. 14, 2020

(65) Prior Publication Data

US 2022/0184671 A1 Jun. 16, 2022

(51) Int. Cl.

| | |
|---|---|
| ***E01C 23/06*** | (2006.01) |
| ***B08B 7/02*** | (2006.01) |
| ***B08B 9/08*** | (2006.01) |
| ***B28C 5/42*** | (2006.01) |
| ***F15B 11/10*** | (2006.01) |
| ***F15B 13/06*** | (2006.01) |

(52) U.S. Cl.

CPC .................. *B08B 7/02* (2013.01); *B08B 9/08* (2013.01); *B28C 5/4213* (2013.01); *E01C 23/065* (2013.01); *F15B 11/10* (2013.01); *F15B 13/06* (2013.01); *E01C 2301/00* (2013.01); *F15B 2211/405* (2013.01)

(58) Field of Classification Search

CPC .......... B08B 7/02; B08B 9/08; B28C 5/4213; E01C 23/065; E01C 2301/00; F15B 11/10; F15B 13/06; F15B 2211/405

USPC ...................................................... 404/90–94

See application file for complete search history.

(56) References Cited

U.S. PATENT DOCUMENTS

| | | | | |
|---|---|---|---|---|
| 6,152,648 | A * | 11/2000 | Gfroerer | E01C 23/088 404/93 |
| 7,449,072 | B1 * | 11/2008 | Johnson | F42B 33/06 134/1 |
| 9,506,205 | B1 | 11/2016 | Lee et al. | |
| 9,737,916 | B2 * | 8/2017 | Schneider | B08B 7/02 |
| 11,548,043 | B2 * | 1/2023 | Procksch | B65D 88/66 |
| 2014/0308075 | A1 * | 10/2014 | Killion | E01C 23/088 404/84.05 |
| 2015/0117951 | A1 * | 4/2015 | Schlenker | E01C 23/088 404/84.05 |
| 2016/0305082 | A1 * | 10/2016 | Schlenker | E02D 3/12 |
| 2016/0326701 | A1 * | 11/2016 | Schlenker | E01C 23/065 |

(Continued)

FOREIGN PATENT DOCUMENTS

DE WO 2019/048234 * 3/2019 ............. B65D 88/66

*Primary Examiner* — Raymond W Addie

(57) ABSTRACT

A method and system for removing material build-up in a mixing chamber of a rotary mixer machine. The system includes one or more actuators coupled to the mixing chamber and to a frame of the rotary mixer machine. Further, the system includes a controller configured to receive an input and activate the one or more actuators in response to the input to induce a forward and backward rocking motion in the mixing chamber to cause a dislodgement of the material build-up from the mixing chamber. The mixing chamber executes the forward and backward rocking motion between a first position and a second position about an axis disposed transversally to a length of the rotary mixer machine.

18 Claims, 5 Drawing Sheets

(56) References Cited

U.S. PATENT DOCUMENTS

| | | | | |
|---|---|---|---|---|
| 2018/0023260 | A1* | 1/2018 | Muir | E01C 21/00 404/84.05 |
| 2018/0135257 | A1* | 5/2018 | Schlenker | E02F 3/20 |

* cited by examiner

SYSTEM AND METHOD FOR REMOVING MATERIAL BUILD-UP IN MIXING CHAMBER OF ROTARY MIXER MACHINE

TECHNICAL FIELD

The present disclosure relates to a rotary mixer machine having a mixing chamber, and more particularly, to a system and method for removing or dislodging a build-up (e.g., of a reclaimed material mixture) from the mixing chamber of the rotary mixer machine.

BACKGROUND

Rotary mixer machines may be used to cut, mix, and pulverize ground surfaces, (e.g., a roadway) that may be composed of one or more layers of materials (e.g., a base layer and an asphalt layer disposed over the base layer). A rotary mixer machine typically includes a rotor and a mixing chamber that defines a housing for the rotor. The rotor generally includes multiple cutting tools and is spun by a suitable mechanism. As the rotor spins, the cutting tools of the rotor may be brought into contact with the ground surface to break up and pulverize the one or more layers of materials from the ground surface. The broken layers of materials may be mixed with additives, such as water, asphalt emulsion, etc., to produce a reclaimed material mixture.

During pulverization and mixing, a spinning action of the rotor and/or the cutting tools may cause a significant quantity of the reclaimed material mixture to be hurled and thrown-up against interior surfaces of walls of the mixing chamber. Portions of such reclaimed material mixture may adhere to said interior surfaces, gradually leading to the formation of a build-up (of reclaimed material mixture) within the mixing chamber. Such a build-up may cause one or more ends or portions of the mixing chamber to weigh differently (e.g., relatively high than the other ends or portions) and may cause one or more such ends or portions to tilt or stoop towards the ground surface. As the rotor mixer machine may travel over the ground surface, such a tilt may cause the ends or portions of the mixing chamber to come into contact with the ground surface to be dragged along the ground surface, thereby making the mixing chamber prone to damage.

U.S. patent application Ser. No. 15/352,345 discloses a rotary mixer having a frame, a rotor, and a mixing chamber. The mixing chamber may be configured to move with respect to the frame of the rotary mixer. More specifically, the mixing chamber may be configured to tiltably move with respect to the frame of the rotary mixer between a lowered and raised position.

SUMMARY OF THE INVENTION

In an aspect, the present disclosure is directed to a method for removing material build-up in a mixing chamber of a rotary mixer machine. The method includes receiving, by a controller, an input; and activating, by the controller, one or more actuators in response to the input to induce a forward and backward rocking motion in the mixing chamber. The mixing chamber executes the forward and backward rocking motion between a first position and a second position about an axis disposed transversally to a length of the rotary mixer machine.

In another aspect, the present disclosure relates to a system for removing material build-up in a mixing chamber of a rotary mixer machine. The system includes one or more actuators coupled to the mixing chamber and to a frame of the rotary mixer machine. Further, the system includes a controller configured to receive an input and activate the one or more actuators in response to the input to induce a forward and backward rocking motion in the mixing chamber. The mixing chamber executes the forward and backward rocking motion between a first position and a second position about an axis disposed transversally to a length of the rotary mixer machine.

In yet another aspect, the present disclosure relates to a rotary mixer machine. The rotary mixer machine includes a frame, a mixing chamber operably coupled to the frame and including a rotor configured to spin to break up and pulverize one or more layers of materials from a ground surface, one or more actuators coupled to the mixing chamber and to the frame, and a controller. The controller is configured to receive an input and activate the one or more actuators in response to the input to induce a forward and backward rocking motion in the mixing chamber. The mixing chamber executes the forward and backward rocking motion between a first position and a second position about an axis disposed transversally to a length of the rotary mixer machine.

DETAILED DESCRIPTION

Reference will now be made in detail to embodiments of the disclosure, examples of which are illustrated in the accompanying drawings. Wherever possible, the same reference numbers will be used throughout the drawings to refer to the same or like parts.

Figure 1:
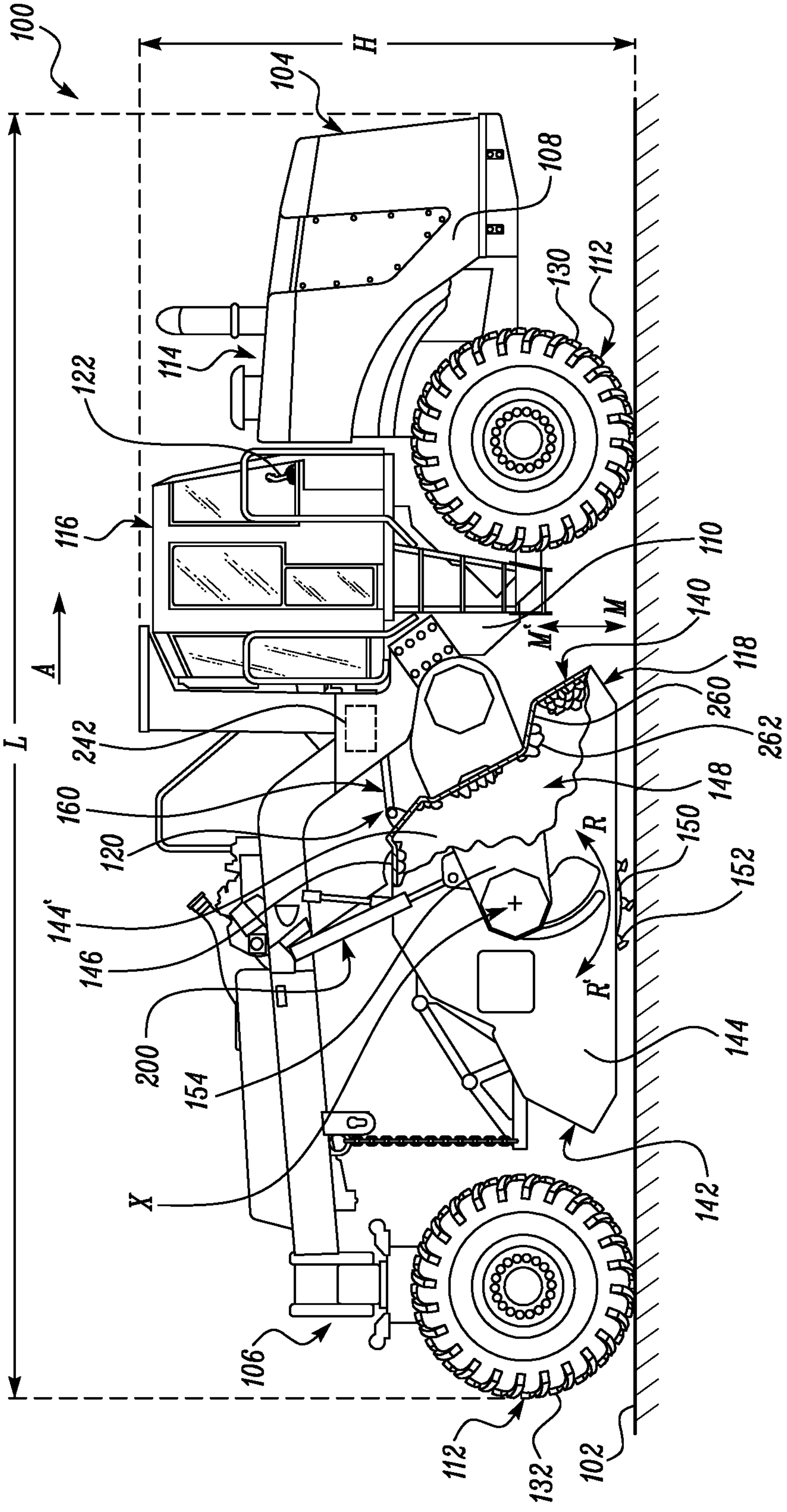
FIG. 1 is a side view of a rotary mixer machine having a mixing chamber, in accordance with an embodiment of the present disclosure.
Figure 2:
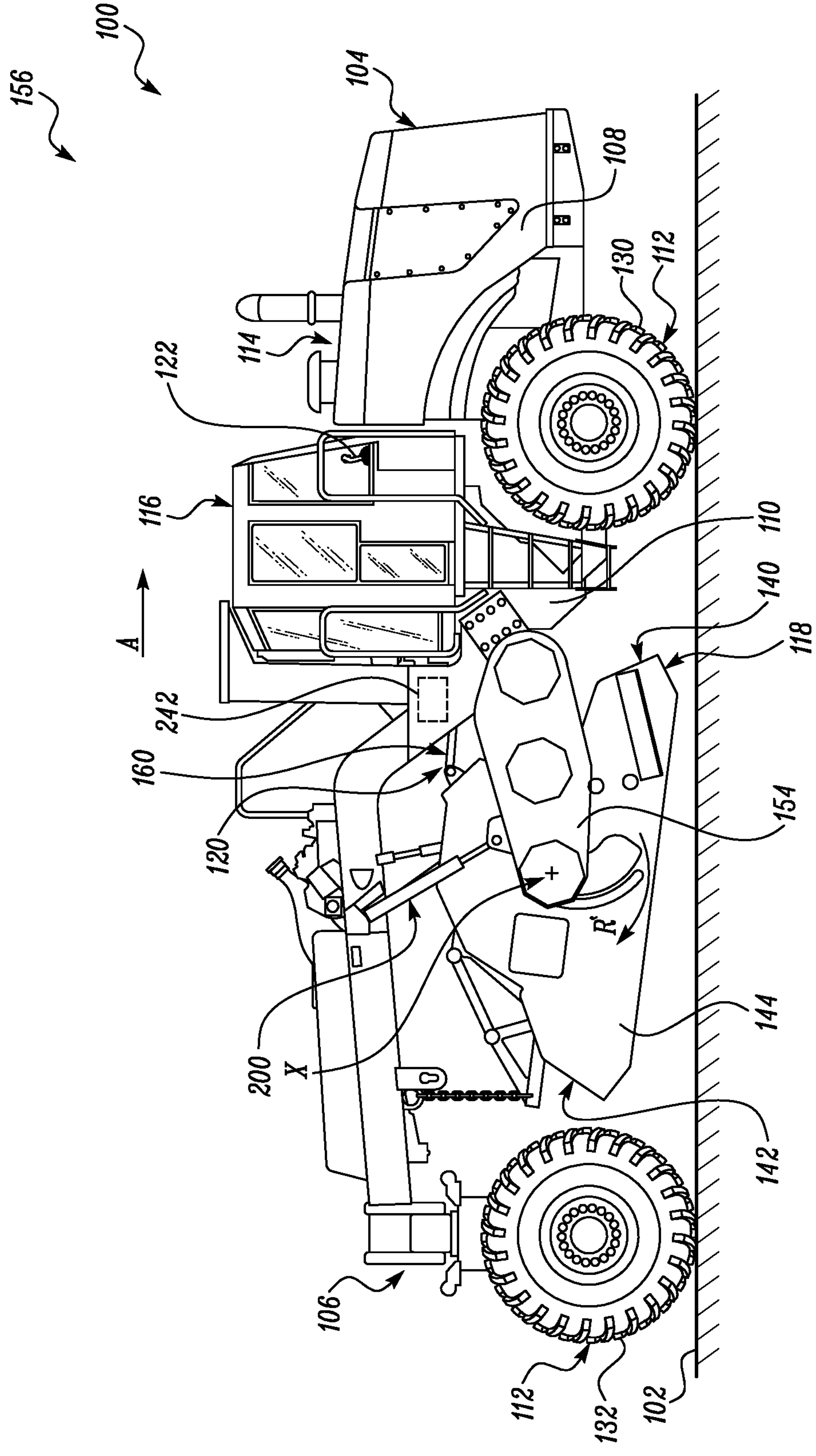
FIG. 2 is a side view of the rotary mixer machine having the mixing chamber in a first position, in accordance with an embodiment of the present disclosure.
Figure 3:
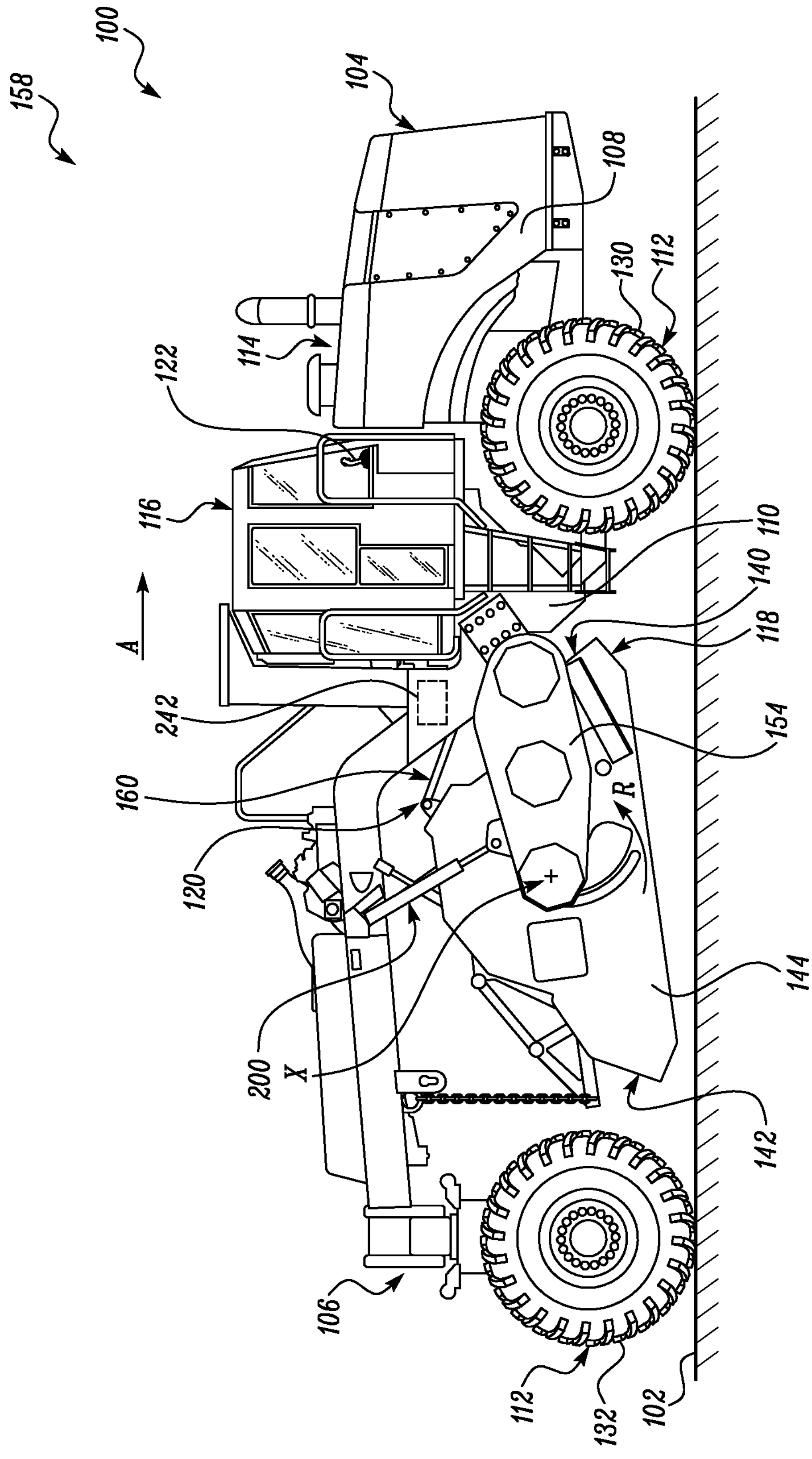
FIG. 3 is a side view of the rotary mixer machine having the mixing chamber in a second position, in accordance with an embodiment of the present disclosure.

Referring to FIGS. 1, 2, and 3, a rotary mixer machine 100 (hereinafter referred to as a machine 100, for ease in reference) is illustrated. The machine 100 may be used to cut, mix, and pulverize a ground surface 102, (e.g., a roadway) for various purposes such as construction of roads and buildings, and also for various applications, such as agriculture. The machine 100 may include a forward end 104 and a rearward end 106 opposite to the forward end 104. The forward end 104 and the rearward end 106 may be defined in relation to an exemplary direction of travel (indicated by an arrow 'A') of the machine 100, with said direction of travel being defined from the rearward end 106 towards the forward end 104. A length 'L' of the machine 100 is defined between the forward end 104 and the rearward end 106. Also, the machine 100 may include two lateral sides—a first lateral side 108 and a second lateral side (not shown) opposite to the first lateral side 108. The side view of the machine 100 illustrated in FIGS. 1, 2, and 3, depict the first lateral side 108 of the machine 100. The two lateral sides, i.e., the first lateral side 108 and the second lateral side, may be located transversely relative to the exemplary direction of travel 'A' or length 'L' of the machine 100.

The machine 100 includes a frame 110, ground-engaging members 112, a propulsion system 114, an operator cabin 116, a mixing chamber 118, and one or more actuators 120. The frame 110 may extend from the forward end 104 to the rearward end 106 of the machine 100. The frame 110 may accommodate the propulsion system 114, the operator cabin 116, the mixing chamber 118, and the one or more actuators 120, although other known components and structures may be supported by the frame 110, as well.

The frame 110 may be supported on the ground surface 102 by the ground-engaging members 112. In the illustrated embodiment, the ground-engaging members 112 include a pair of front wheels 130 (only one wheel shown) disposed adjacent to the forward end 104 and a pair of rear wheels 132 (only one wheel shown) disposed at the rearward end 106 of the machine 100. The pair of front wheels 130 and the pair of rear wheels 132 may be configured to propel the machine 100 on the ground surface 102 in a desired direction and at a desired speed, according to a customary practice known in the art. In some embodiments, the ground-engaging members 112 may include crawler tracks (not shown) provided either alone or in combination with the wheels 130, 132.

The ground-engaging members 112 may be powered by the propulsion system 114 to operate, and to propel the machine 100 along the ground surface 102. The propulsion system 114 may include an engine (not shown), such as an internal combustion engine, configured to power operations of various systems on the machine 100, typically by combusting fuel. Optionally, the propulsion system 114 may also include an electrical power source, applicable either alone or in combination with the internal combustion engine.

The operator cabin 116 may be supported over the frame 110. The operator cabin 116 may facilitate stationing of one or more operators therein, to monitor the operations of the machine 100. Also, the operator cabin 116 may house various components and controls of the machine 100, access to one or more of which may help the operators to control the machine's movement and/or operation. For example, the operator cabin 116 may include an input device 122 (see FIG. 1 and FIG. 4), that may be used and/or actuated to generate an input for facilitating control of one or more implements (e.g., the mixing chamber 118) of the machine 100. The input device 122 may include, but not limited to, one or more of touch screens, joysticks, switches, and the like. In the illustrated embodiment, the operator cabin 116 is located proximal to the forward end 104 of the machine 100 and distal to the rearward end 106 of the machine 100. In some embodiments, the machine 100 may be operated autonomously or semi-autonomously. In such a case, the operator cabin 116 may be omitted from the machine 100 and may be located remotely from the machine 100.

Continuing with FIGS. 1, 2, and 3, the mixing chamber 118 may include a first end 140 and a second end 142 opposite to the first end 140. The first end 140 and the second end 142 may be defined in relation to the exemplary direction of travel 'A' of the machine 100. The first end 140 may be proximal to the forward end 104 and distal to the rearward end 106, and the second end 142 may be proximal to the rearward end 106 and distal to the forward end 104.

Further, the mixing chamber 118 may include a first side plate 144 and a second side plate 144' disposed opposite to the first side plate 144. Each of the first side plate 144 and the second side plate 144' may be identical in shape and size to each other. Each of the first side plate 144 and the second side plate 144' may extend from the first end 140 to the second end 142 of the mixing chamber 118. The first side plate 144 and the second side plate 144' are located towards either sides of the machine 100—e.g., the first side plate 144 may be disposed towards the first lateral side 108 of the machine 100, while the second side plate 144' may be disposed towards the second lateral side (not shown) of the machine 100.

In an exemplary embodiment, an intermediate plate 146 may be extended between identical edge portions defined by the identically shaped and sized, first side plate 144 and the second side plate 144' to couple the first side plate 144 with the second side plate 144'. In one embodiment, the first side plate 144, the second side plate 144', and the intermediate plate 146 may be coupled to each other using fasteners, such as nuts and bolts. In another embodiment, the first side plate 144, the second side plate 144', and the intermediate plate 146 may be welded to each other to form an integrated structure. The mixing chamber 118, as defined by the above discussed layout of the first side plate 144, second side plate 144', and the intermediate plate 146, also defines a cavity 148 of the mixing chamber 118.

Furthermore, the mixing chamber 118 houses a rotor 150 of the machine 100. The rotor 150 may be positioned within the cavity 148 and may include multiple cutting tools 152 arranged around its periphery. In the present embodiment, the rotor 150 is at least partially disposed within the cavity 148 of the mixing chamber 118. In that manner, the first side plate 144 and the second side plate 144' (or the mixing chamber 118) may partially surround the rotor 150. The rotor 150 may be spun and be brought into contact with the ground surface 102 to break-up and pulverize one or more layers of materials (not shown) from the ground surface 102. In this regard, a rotor drive train 154 may receive power from the propulsion system 114 and may transfer the power to the rotor 150 to spin the rotor 150. During operation, as the machine 100 may advance along the ground surface 102 to be reclaimed and stabilized, the rotor 150 and multiple cutting tools 152 may penetrate the ground surface 102, break-up and lift the one or more layers of materials from the ground surface 102, thereby causing the material to agglomerate and be collected within the mixing chamber 118.

In the illustrated embodiment, the mixing chamber 118 and the rotor 150 are disposed between the pair of front wheels 130 and the pair of rear wheels 132. However, in some embodiments, it may be contemplated that the mixing chamber 118 and the rotor 150 may be disposed at an alternative location, such as at one of the forward end 104 and the rearward end 106, of the machine 100. In the illustrated embodiment, only one rotor 150 is disposed within the mixing chamber 118. However, in some embodiments, it may be contemplated that more than one rotor may be disposed within the mixing chamber 118.

The mixing chamber 118 may be configured to pan and move between a myriad of positions. According to one aspect of the present disclosure, the mixing chamber 118 moves between a first position 156 (see FIG. 2) and a second position 158 (see FIG. 3). The first position 156 corresponds to an orientation of the mixing chamber 118 at which the first end 140 is disposed lower with respect to the ground surface 102 than the second end 142 of the mixing chamber 118, and the second position 158 corresponds to an orientation of the mixing chamber 118 at which the second end 142 is disposed lower with respect to the ground surface 102 than the first end 140 of the mixing chamber 118.

The mixing chamber 118 may be operably coupled to the frame 110 via the actuators 120 (hereinafter referred to as first actuators 120). The first actuators 120 may support the mixing chamber 118 under the frame 110. For example, the first actuators 120 may be disposed between the frame 110 and the mixing chamber 118 to actuate or move the mixing chamber 118 with respect to the frame 110. During operation, when the first actuators 120 are actuated, the mixing chamber 118 may move between the first position 156 and the second position 158. In some embodiments, an actuation of the first actuators 120 may subject the mixing chamber 118 to a forward and backward rocking motion (see arrows R, R', and hereinafter referred as "rocking motion"), between the first position 156 and the second position 158, about an axis 'X' disposed transversally to the length of the machine 100. For the purposes of the present disclosure, the rocking motion executed by the mixing chamber 118 may be defined as: a movement of the mixing chamber 118 from the first position 156 to the second position 158 and then back to the first position 156. In some embodiments, the rotor 150 may be disposed along and configured to rotate about said axis 'X'. In the illustrated embodiment, only one first actuator 120 is coupled to the mixing chamber 118 and the frame 110. However, a higher number of the first actuators may be coupled to the mixing chamber 118 and the frame 110, as well.

Figure 4:
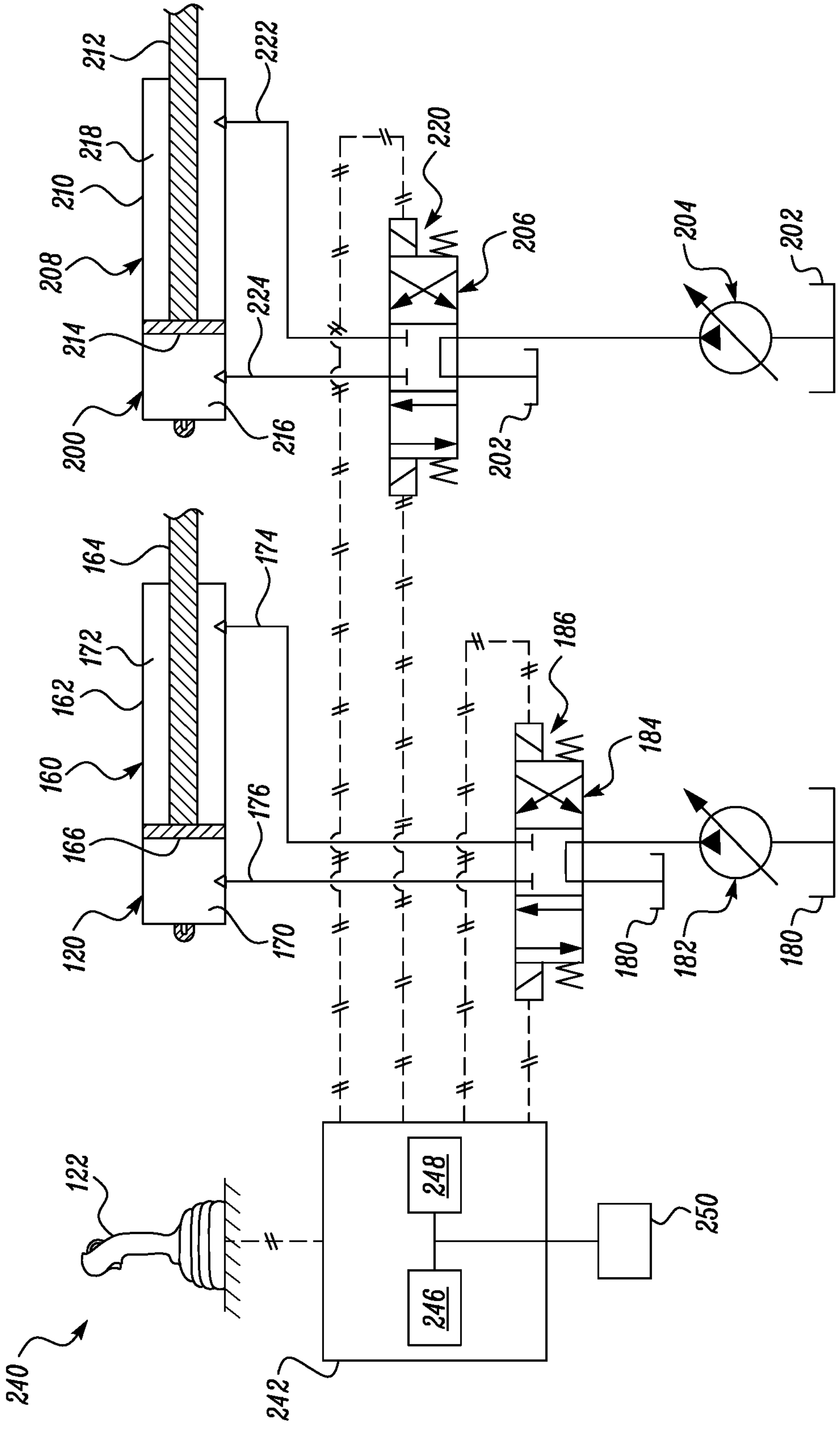
FIG. 4 is a schematic view of an exemplary system for removing material build-up in the mixing chamber of the rotary mixer machine, in accordance with an embodiment of the present disclosure.

Referring to FIG. 4, the first actuators 120 may include fluid actuators 160. The fluid actuators 160 (or the first actuators 120) may include a cylinder portion 162 and a rod portion 164. The rod portion 164 may be displaceable with respect to the cylinder portion 162. The rod portion 164 may be fixedly coupled to a piston 166 accommodated within the cylinder portion 162, with the piston 166 dividing the cylinder portion 162 into a head end chamber 170 and a rod end chamber 172.

Both the head end chamber 170 and the rod end chamber 172 may be configured to receive fluid for displacing the rod portion 164 with respect to the cylinder portion 162. In the present embodiment, the rod end chamber 172 may receive fluid to actuate the one or more fluid actuators 160 (or the first actuators 120) towards a first condition (e.g., towards a minimum displacement position) and move the mixing chamber 118 towards the first position 156, and the head end chamber 170 may receive fluid to actuate the fluid actuator 160 (or the first actuator 120) towards a second condition (e.g., towards a maximum displacement position) and move the mixing chamber 118 towards the second position 158.

The machine 100 may include a tank 180, a fluid source 182, and a first control valve 184. The tank 180 may include a reservoir configured to store fluid. The fluid source 182 may be fluidly coupled with the tank 180. The fluid source 182 may be a hydraulic pump (e.g., a variable displacement pump) configured to draw fluid from the tank 180 and provide a pressurized fluid to the one or more fluid actuators 160 (or the one or more first actuators 120).

The first control valve 184 may be fluidly coupled between the fluid source 182 and the fluid actuators 160. In the illustrated embodiment, the first control valve 184 may be a directional valve having a first spring biased mechanism 186 that is solenoid actuated and configured to move between a first position at which the fluid is blocked from flowing from the fluid source 182 to the first actuators 120 (or fluid actuators 160) and a second position at which the fluid is allowed to flow from the fluid source 182 to the first actuators 120 (or fluid actuators 160). In this way, the first spring biased mechanism 186 may facilitate the first control valve 184 to move between a first state, a second state, and a closed state. In an example, the first spring biased mechanism 186 is solenoid actuated to move towards the second position to facilitate the first control valve 184 to attain the first state and/or the second state, and is spring biased to return to the first position to facilitate the first control valve 184 to attain the closed state. In some embodiments, it may be contemplated that the first control valve 184 may alternatively be hydraulically actuated, mechanically actuated, pneumatically actuated, or actuated in any other suitable manner.

In the first state, the first control valve 184 may direct fluid from the fluid source 182 to the rod end chamber 172, via a rod end passageway 174, and may cause the head end chamber 170 to release the fluid, via a head end passageway 176, to the tank 180 to actuate the fluid actuator 160 (or the first actuator 120) towards the first condition, thereby retracting the piston 166 (or rod portion 164) into the cylinder portion 162, and moving the mixing chamber 118 towards the first position 156. In the second state, the first control valve 184 may direct fluid from the fluid source 182 to the head end chamber 170, via the head end passageway 176, and may cause the rod end chamber 172 to release the fluid, via rod end passageway 174, to the tank 180 to actuate the fluid actuator 160 (or the first actuator 120) towards the second condition, thereby expanding the piston 166 (or rod portion 164) out of the cylinder portion 162, and moving the mixing chamber 118 towards the second position 158. In the closed state, the first control valve 184 may restrict the flow of fluid to the fluid actuators 160 (or first actuators 120).

Referring again to FIGS. 1 and 4, the machine 100 may further include one or more second actuators 200, a tank 202, a fluid source 204, and a second control valve 206. In the illustrated embodiment, the second actuators 200 may be coupled at one end to the frame 110 and at the other end to the mixing chamber 118. During operation, when the second actuators 200 are actuated, the mixing chamber 118 may be raised or lowered with respect to the ground surface 102. Therefore, the second actuators 200 may provide or induce a motion generally along a height 'H' of the machine 100 (e.g., an upward and downward motion, see arrows M, M', in FIG. 1). In the exemplary embodiment, the second actuators 200 are actuated to raise the mixing chamber 118 up to a predefined height threshold with respect to the ground surface 102 at which the mixing chamber 118 may be suspended under the frame 110 to float freely relative to the frame 110. In another exemplary embodiment, the second actuators 200 are actuated to lower the mixing chamber 118 up to a predefined depth threshold with respect to the ground surface 102 at which the rotor 150 may penetrate into the one or more layers of the ground surface 102 to break open the ground surface 102. According to an example embodiment, two second actuators 200 may be operably coupled between the mixing chamber 118 and the frame 110 so as to cause the mixing chamber 118 to move with respect to the frame 110. The second actuators 200 may be located on corresponding sides of the mixing chamber 118 (i.e., one second actuator may be located towards the first lateral side 108 while the other second actuator may be located towards the second lateral side). Only one second actuator 200 is visible in the orientation of the machine 100 in FIGS. 1 and 4. It may be contemplated that lesser or higher number of the second actuators 200 may be coupled to the mixing chamber 118 and the frame 110 to cause the mixing chamber 118 to move with respect to the frame 110.

Similar to the first actuators 120, the second actuators 200 may include one or more fluid actuators 208, each having a cylinder portion 210 and a rod portion 212. The rod portion 212 may be displaceable with respect to the cylinder portion 210. The rod portion 212 may be fixedly coupled to a piston 214 accommodated within the cylinder portion 210, with the piston 214 dividing the cylinder portion 210 into a head end chamber 216 and a rod end chamber 218. Both the head end chamber 216 and the rod end chamber 218 may be configured to receive fluid for displacing the piston 214 (or the rod portion 212) with respect to the cylinder portion 210. In the present embodiment, the rod end chamber 218 may receive fluid to actuate the fluid actuator 208 (or the second actuator 200) towards a first condition (i.e., towards a minimum displacement position) and raise the mixing chamber 118 up towards the predefined height threshold with respect to the ground surface 102, and the head end chamber 216 may receive fluid to actuate the fluid actuator 208 (or the second actuator 200) towards a second condition (i.e., towards a maximum displacement position) and lower the mixing chamber 118 towards the predefined depth threshold with respect to the ground surface 102.

The tank 202 include a reservoir configured to store fluid. In the illustrated embodiment, the tank 202 is different from the tank 180. However, in some embodiments, it may be contemplated that the tank 202 may be one and the same as the tank 180. The fluid source 204 may be fluidly connected with the tank 202. The fluid source 204 may be a hydraulic pump (e.g., a variable displacement pump) configured to draw fluid from the tank 202 and provide a pressurized fluid to the fluid actuators 208 (or the second actuators 200). Although in the present embodiment, the fluid source 204 is shown to be different from the fluid source 182, in some cases, a single fluid source (i.e., the fluid source 204 or the fluid source 182) may be applied to supply fluid to both the first actuators 120 and the second actuators 200.

The second control valve 206 may be fluidly coupled between the fluid source 204 and the fluid actuators 208. In the illustrated embodiment, the second control valve 206 may be a directional valve having a second spring biased mechanism 220 that is solenoid actuated and configured to move between a first position at which the fluid is blocked from flowing from the fluid source 204 to the second actuators 200 (or fluid actuators 208) and a second position at which the fluid is allowed to flow from the fluid source 204 to the second actuators 200 (or fluid actuators 208). In this way, the second spring biased mechanism 220 may facilitate the second control valve 206 to move between a first state, a second state, and a closed state. In an example, the second spring biased mechanism 220 is solenoid actuated to move towards the second position to facilitate the second control valve 206 to attain the first state and/or the second state, and is spring biased to return to the first position to facilitate the second control valve 206 to attain the closed state. In some embodiments, it may be contemplated that the second control valve 206 may alternatively be hydraulically actuated, mechanically actuated, pneumatically actuated, or actuated in any other suitable manner.

In the first state, the second control valve 206 may direct fluid from the fluid source 204 to the rod end chamber 218, via a rod end passageway 222, and may cause the head end chamber 216 to release fluid, via a head end passageway 224, to the tank 202 to actuate the fluid actuator 208 (or the second actuator 200) towards the first condition, thereby retracting the piston 214 (or the rod portion 212) into the cylinder portion 210 and raising the mixing chamber 118 up towards the predefined height threshold with respect to the ground surface 102. In the second state, the second control valve 206 may direct fluid from the fluid source 204 to the head end chamber 216, via the head end passageway 224, and may cause the rod end chamber 218 to release the fluid, via the rod end passageway 222, to the tank 180 to actuate the fluid actuator 208 (or the second actuator 200) towards the second condition, thereby expanding the piston 214 (or the rod portion 212) out of the cylinder portion 210, and lowering the mixing chamber 118 towards the predefined depth threshold with respect to the ground surface 102. In the closed state, the second control valve 206 may restrict the flow of fluid to the fluid actuators 208 (or second actuators 200).

Continuing with FIGS. 1 and 4, the machine 100 includes a system 240 for removing a material build-up 262 in the mixing chamber 118. In an example, the system 240 is applied to activate the first actuators 120 (or fluid actuators 160) to induce the forward and backward rocking motion in the mixing chamber 118. In that manner, the system 240 facilitates the mixing chamber 118 to execute the forward and backward rocking motion about the axis 'X', thereby removing the material build-up 262 formed within the mixing chamber 118. In this regard, the system 240 includes a controller 242—details of which will be discussed further below. In one or more embodiments, the first actuators 120 and the second actuators 200, as discussed above, may form part of the system 240, as well.

The controller 242 may be communicably coupled (e.g., wirelessly) to the input device 122. The controller 242 may be able to detect an actuation of the input device 122 and receive the input from the input device 122. Based on such actuation and the receipt of the input, the controller 242 may be configured to activate the first actuators 120 to induce the forward and backward rocking motion in the mixing chamber 118.

Further, the controller 242 may be communicably coupled to the first control valve 184, via solenoids of the first spring biased mechanism 186, and the second control valve 206, via solenoids of the second spring biased mechanism 220. In response to the input received from the input device 122, the controller 242 may energize the solenoids of the first spring biased mechanism 186 to move the first control valve 184 between the first state (in which fluid is received by the rod end chamber 172 and is released by the head end chamber 170 to actuate the fluid actuator 160 towards the first condition, as discussed above) and the second state (in which fluid is received by the head end chamber 170 and is released by the rod end chamber 172 to actuate the fluid actuator 160 towards the second condition, as discussed above). In that manner, the controller 242 may move the first control valve 184 which may further activate the first actuators 120 to induce the forward and backward rocking motion in the mixing chamber 118.

Similarly, in response to the input received from the input device 122, the controller 242 may energize the solenoids of the second spring biased mechanism 220 to move the second control valve 206 between the first state (in which fluid is received by the rod end chamber 218 and is released by the head end chamber 216 to actuate the fluid actuator 208 towards the first condition, as discussed above) and the second state (in which fluid is received by the head end chamber 216 and is released by the rod end chamber 218 to actuate the fluid actuator 208 towards the second condition, as discussed above). In that manner, the controller 242 may move the second control valve 206 which may further activate the second actuators 200 (or fluid actuators 208) to raise or lower the mixing chamber 118 with respect to the ground surface 102.

The controller 242 may include a processor 246 to process the input received from the input device 122. Examples of the processor 246 may include, but are not limited to, an X86 processor, a Reduced Instruction Set Computing (RISC) processor, an Application Specific Integrated Circuit (ASIC) processor, a Complex Instruction Set Computing (CISC) processor, an Advanced RISC Machine (ARM) processor, or any other processor.

Further, the controller 242 may include a transceiver 248. According to various embodiments of the present disclosure, the transceiver 248 may enable the controller 242 to communicate (e.g., wirelessly) with the input device 122, the solenoids associated with first spring biased mechanism 186, and the solenoids associated with the second spring biased mechanism 220, over one or more of wireless radio links, infrared communication links, short wavelength Ultra-high frequency radio waves, short-range high frequency waves, or the like. Example transceivers may include, but not limited to, wireless personal area network (WPAN) radios compliant with various IEEE 802.15 (Bluetooth™) standards, wireless local area network (WLAN) radios compliant with any of the various IEEE 802.11 (WiFi™) standards, wireless wide area network (WWAN) radios for cellular phone communication, wireless metropolitan area network (WMAN) radios compliant with various IEEE 802.15 (WiMAX™) standards, and wired local area network (LAN) Ethernet transceivers for network data communication.

Furthermore, the controller 242 may include a memory 250 for accomplishing a task consistent with the present disclosure. The memory 250 may be configured to store data and/or routines that may assist the controller 242 to perform its functions. Examples of the memory 250 may include a hard disk drive (HDD), and a secure digital (SD) card. Further, the memory 250 may include non-volatile/volatile memory units such as a random-access memory (RAM)/a read only memory (ROM), which include associated input and output buses.

INDUSTRIAL APPLICABILITY

During a work cycle, as the machine 100 traverses over the ground surface 102 to perform at least one of road reclamation, soil stabilization, surface pulverization, and other related application, a spinning action of the rotor 150 and the cutting tools 152 may cause a significant amount of material (e.g., reclaimed material mixture) of the ground surface 102 to be thrown-up against interior surfaces 260 (see FIG. 1) of the mixing chamber 118. Portions of such material may get adhered to the interior surfaces 260 of the mixing chamber 118 thereby leading to the formation of the material build-up 262 within the mixing chamber 118 (see FIG. 1). In an exemplary scenario, such material build-up 262 may cause at least one of the first end 140 and the second end 142 or certain portions of the mixing chamber 118 to weigh differently (e.g., relatively high than other ends or portions) and may cause a heavier end to tilt or stoop towards the ground surface 102. Once the work cycle is complete, and as the machine 100 may traverse over the ground surface 102, such a tilt may possibly cause the heavier end to come into contact with the ground surface 102 and to be dragged along the ground surface 102. In order to remove such material build-up 262 within the mixing chamber 118, the system 240 is provided. The system 240, according to the embodiments of the present disclosure, includes the controller 242 that receives an input to remove the material build-up 262 within the mixing chamber 118 and activates the one or more first actuators 120 to induce the forward and backward rocking motion in the mixing chamber 118 to dislodge the material build-up 262 from the mixing chamber 118.

Figure 5:
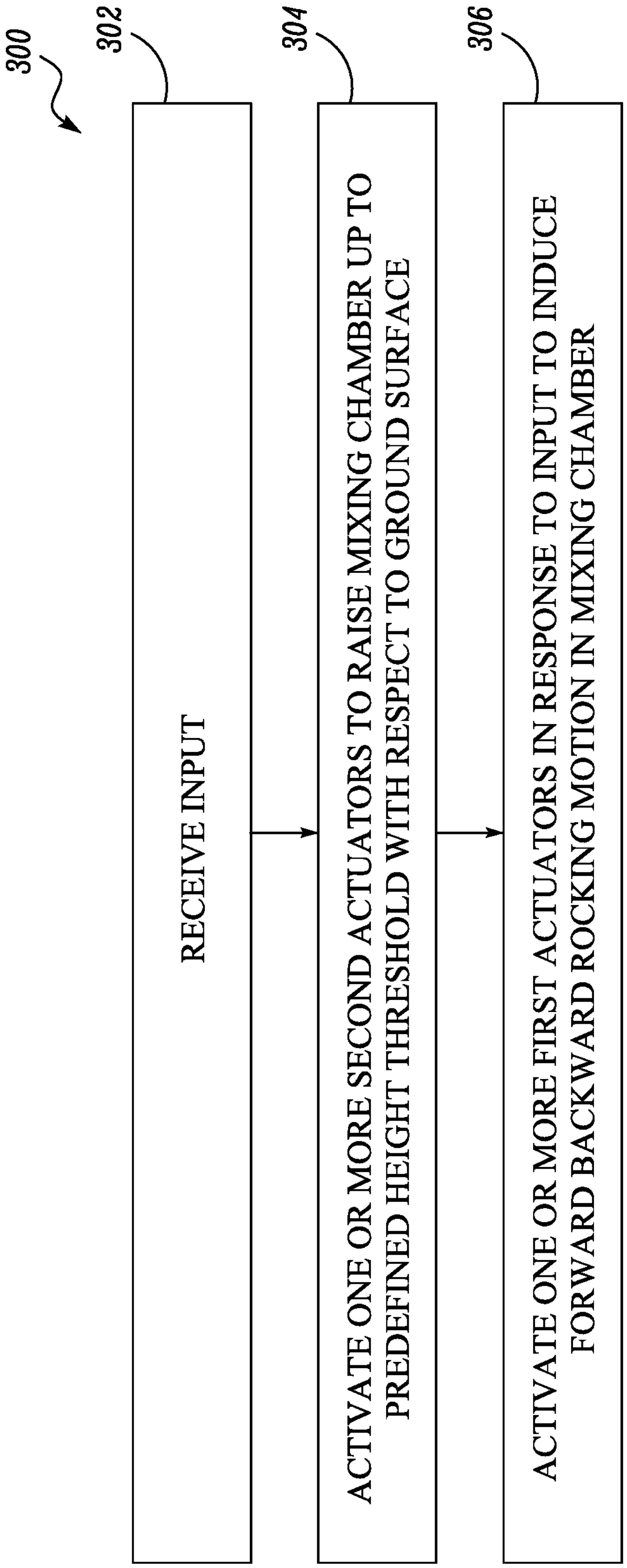
FIG. 5 is an exemplary method for removing material build-up in the mixing chamber of the rotary mixer machine of FIGS. 1, 2, and 3, in accordance with an embodiment of the present disclosure.

Referring to FIG. 5, an exemplary method 300 for removing the material build-up 262 in the mixing chamber 118 is discussed. The method 300 is also discussed in conjunction with FIGS. 1-4. By viewing FIGS. 2 and 3 together, as discussed above, two different positions of the mixing chamber 118 may be contemplated and visualized—the first position 156 at which the first end 140 is disposed lower with respect to the ground surface 102 than the second end 142 of the mixing chamber 118 (see FIG. 2), and the second position 158 at which the second end 142 is disposed lower with respect to the ground surface 102 than the first end 140 of the mixing chamber 118 (see FIG. 3).

Once the work cycle is complete, an operator of the machine 100 may desire to remove or dislodge the material build-up 262 present within the mixing chamber 118. In this regard, the operator may indicate the desire for removal of the material build-up 262 by manipulating/actuating the input device 122 in such a manner to generate the input and signal the controller 242 that the removal of the material build-up 262 is desired. The controller 242 may receive said signal or input (step 302 of the method 300).

Once the controller 242 receives the input, the controller 242 may move the second control valve 206 to the first state (e.g., from a closed state or the second state). In such a case, the second control valve 206 may direct fluid from the fluid source 204 to the rod end chamber 218, simultaneously causing fluid from the head end chamber 216 to be moved to the tank 202. In so doing, the piston 214 (or the rod portion 212) is retracted into the cylinder portion 210 (to attain the first condition). In that manner, the controller 242 may activate the second actuators 200 to raise the mixing chamber 118 up to a height (e.g., the predefined height threshold) with respect to the ground surface 102 (step 304 of the method 300).

Once the mixing chamber 118 is raised up to the predefined height threshold, the controller 242, as continued response to the input, may move the first control valve 184 between the first state and the second state to activate the first actuator 120 and induce the forward and backward rocking motion in the mixing chamber 118. The rocking motion may be executed between the first position 156 and the second position 158 about the axis 'X'. In an exemplary scenario, the controller 242 may move the first control valve 184 to the first state in which the first control valve 184 may direct fluid from the fluid source 182 to the rod end chamber 172, and simultaneously cause the head end chamber 170 to release the fluid to the tank 180, to actuate the fluid actuator 160 (or the first actuator 120) towards the first condition and move the mixing chamber 118 towards the first position 156.

Once the mixing chamber 118 attains the first position 156 (see FIG. 2), the controller 242 may move the first control valve 184 to the second state in which the first control valve 184 may direct fluid from the fluid source 182 to the head end chamber 170, and simultaneously cause the rod end chamber 172 to release the fluid to the tank 180, to actuate the fluid actuator 160 (or the first actuator 120) towards the second condition and move the mixing chamber 118 towards the second position 158. In that manner, the controller 242 may activate the actuators 120 (or first actuators 120, or fluid actuators 160) to induce the forward and backward rocking motion, i.e., oscillatory motion between the first position 156 and the second position 158, in the mixing chamber 118 (step 306 of the method 300).

In the present embodiment, the controller 242 may cause the first control valve 184 to cycle between the first state and the second state, at a frequency. As a result, the first actuators 120 (or fluid actuators 160) may be activated, in turn causing the mixing chamber 118 to execute the rocking motion at a corresponding frequency, computable per unit time (e.g., per second). According to some examples, the controller 242 may cause the first control valve 184 to cycle between the first state and the second state to activate the first actuators 120 and cause the mixing chamber 118 to execute the rocking motion at either a constant frequency or a variable frequency. In another embodiment, the operator may provide an input to the controller 242 to also vary the frequency of the rocking motion of the mixing chamber 118.

With the application of the system 240, the system 240 may perform forward and backward rocking motion to cause a removal or dislodgement of the material build-up 262 formed within the mixing chamber 118. This may prevent the ends (i.e., any one of the first end 140 and the second end 142) or any portion of the mixing chamber 118 to stoop towards the ground surface 102, and be dragged along the ground surface 102, thereby preventing damage to the mixing chamber 118 and increasing the operating life of the mixing chamber 118.

It will be apparent to those skilled in the art that various modifications and variations can be made to the method/process of the present disclosure without departing from the scope of the disclosure. Other embodiments will be apparent to those skilled in the art from consideration of the specification and practice of the method/process disclosed herein. It is intended that the specification and examples be considered as exemplary only, with a true scope of the disclosure being indicated by the following claims and their equivalent.

What is claimed is:

1. A method for removing material build-up in a mixing chamber of a rotary mixer machine, the method comprising:
 receiving, by a controller, an input from an input device to activate one or more actuators, wherein the one or more actuators correspond to one or more first actuators and one or more second actuators;
 activating, by the controller, the one or more second actuators in response to the input to raise the mixing chamber up to a predefined height threshold with respect to a ground surface; and
 activating, by the controller, once the mixing chamber is raised up to the predefined height threshold, the one or more first actuators in response to the input to induce a forward and backward rocking motion in the mixing chamber, the forward and backward rocking motion being executed between a first position and a second position about an axis disposed transversally to a length of the rotary mixer machine.

2. The method of claim 1, wherein the one or more actuators include one or more fluid actuators and the rotary mixer machine includes a tank for storing fluid, a fluid source configured to draw fluid from the tank and provide a pressurized fluid to the one or more fluid actuators, and a first control valve fluidly coupled between the fluid source and the one or more fluid actuators.

3. The method of claim 2, wherein the one or more fluid actuators include a cylinder portion and a rod portion displaceable with respect to the cylinder portion to define a head end chamber and a rod end chamber within the one or more fluid actuators,
 the rod end chamber receiving the pressurized fluid to actuate the one or more fluid actuators towards a first condition and move the mixing chamber towards the first position, and
 the head end chamber receiving the pressurized fluid to actuate the one or more fluid actuators towards a second condition and move the mixing chamber towards the second position.

4. The method of claim 3, wherein activating the one or more actuators includes:
 moving, by the controller, the first control valve between a first state and a second state, wherein, in the first state, fluid is received by the rod end chamber and is released by the head end chamber to actuate the one or more fluid actuators towards the first condition, and, in the second state, fluid is received by the head end chamber and is released by the rod end chamber to actuate the one or more fluid actuators towards the second condition.

5. The method of claim 1, wherein the one or more second actuators include one or more fluid actuators and the rotary mixer machine includes a tank for storing fluid, a fluid source configured to draw fluid from the tank and provide a pressurized fluid to the one or more fluid actuators, and a second control valve fluidly coupled between the fluid source and the one or more fluid actuators.

6. The method of claim 5, wherein the one or more fluid actuators of the one or more second actuators include a cylinder portion and a rod portion displaceable with respect to the cylinder portion to define a head end chamber and a rod end chamber within the one or more fluid actuators, the rod end chamber receiving the pressurized fluid to actuate the one or more fluid actuators towards a first condition and raise the mixing chamber up to the predefined height threshold with respect to the ground surface, and the head end chamber receiving the pressurized fluid to actuate the one or more fluid actuators towards a second condition and lower the mixing chamber up to a predefined depth threshold with respect to the ground surface, wherein activating the one or more second actuators includes:
 moving, by the controller, the second control valve between a first state and a second state, wherein, in the first state, fluid is received by the rod end chamber and is released by the head end chamber to actuate the one or more fluid actuators towards the first condition, and, in the second state, fluid is received by the head end chamber and is released by the rod end chamber to actuate the one or more fluid actuators towards the second condition.

7. A system for removing material build-up in a mixing chamber of a rotary mixer machine, the system comprising:
 one or more actuators coupled to the mixing chamber and to a frame of the rotary mixer machine, wherein the one or more actuators correspond to one or more first actuators and one or more second actuators;
 a controller configured to:
  receive an input from an input device;
  activate the one or more second actuators in response to the input to raise the mixing chamber up to a predefined height threshold with respect to a ground surface; and
  activate, once the mixing chamber is raised up to the predefined height threshold, the one or more first actuators in response to the input to induce a forward and backward rocking motion in the mixing chamber, the forward and backward rocking motion being executed between a first position and a second position about an axis disposed transversally to a length of the rotary mixer machine.

8. The system of claim 7, wherein the one or more actuators include one or more fluid actuators and the rotary mixer machine includes a tank for storing fluid, a fluid source configured to draw fluid from the tank and provide a pressurized fluid to the one or more fluid actuators, and a first control valve fluidly coupled between the fluid source and the one or more fluid actuators.

9. The system of claim 8, wherein the one or more fluid actuators include a cylinder portion and a rod portion displaceable with respect to the cylinder portion to define a head end chamber and a rod end chamber within the one or more fluid actuators, the rod end chamber receiving the pressurized fluid to actuate the one or more fluid actuators towards a first condition and move the mixing chamber towards the first position, and the head end chamber receiving the pressurized fluid to actuate the one or more fluid actuators towards a second condition and move the mixing chamber towards the second position.

10. The system of claim 9, wherein the controller is configured to:

move the first control valve between a first state and a second state, wherein, in the first state, fluid is received by the rod end chamber and is released by the head end chamber to actuate the one or more fluid actuators towards the first condition, and, in the second state, fluid is received by the head end chamber and is released by the rod end chamber to actuate the one or more fluid actuators towards the second condition.

11. The system of claim 7, wherein the one or more second actuators include one or more fluid actuators and the rotary mixer machine includes a tank for storing fluid, a fluid source configured to draw fluid from the tank and provide a pressurized fluid to the one or more fluid actuators, and a second control valve fluidly coupled between the fluid source and the one or more fluid actuators.

12. The system of claim 11, wherein the one or more fluid actuators of the one or more second actuators include a cylinder portion and a rod portion displaceable with respect to the cylinder portion to define a head end chamber and a rod end chamber within the one or more fluid actuators, the rod end chamber receiving the pressurized fluid to actuate the one or more fluid actuators towards a first condition and raise the mixing chamber up to the predefined height threshold with respect to the ground surface, and the head end chamber receiving the pressurized fluid to actuate the one or more fluid actuators towards a second condition and lower the mixing chamber up to a predefined depth threshold with respect to the ground surface, wherein the controller is configured to:

move the second control valve between a first state and a second state, wherein, in the first state, fluid is received by the rod end chamber and is released by the head end chamber to actuate the one or more fluid actuators towards the first condition, and, in the second state, fluid is received by the head end chamber and is released by the rod end chamber to actuate the one or more fluid actuators towards the second condition.

13. A rotary mixer machine, comprising:

a frame;

a rotor configured to spin to break up and pulverize one or more layers of materials from a ground surface;

a mixing chamber operably coupled to the frame and at least partially surrounding the rotor;

one or more actuators coupled to the mixing chamber and to the frames, wherein the one or more actuators correspond to one or more first actuators and one or more second actuators;

a controller configured to:

receive an input from an input device;

activate the one or more second actuators in response to the input to raise the mixing chamber up to a predefined height threshold with respect to a ground surface; and activate, once the mixing chamber is raised up to the predefined height threshold, the one or more first actuators in response to the input to induce a forward and backward rocking motion in the mixing chamber, the forward and backward rocking motion being executed between a first position and a second position about an axis disposed transversally to a length of the rotary mixer machine.

14. The rotary mixer machine of claim 13, wherein the one or more actuators include one or more fluid actuators, and the rotary mixer machine includes:

a tank for storing fluid;

a fluid source configured to draw fluid from the tank and provide a pressurized fluid to the one or more fluid actuators; and a first control valve fluidly coupled between the fluid source and the one or more fluid actuators.

15. The rotary mixer machine of claim 14, wherein the one or more fluid actuators include a cylinder portion and a rod portion displaceable with respect to the cylinder portion to define a head end chamber and a rod end chamber within the one or more fluid actuators, the rod end chamber receiving the pressurized fluid to actuate the one or more fluid actuators towards a first condition and move the mixing chamber towards the first position, and the head end chamber receiving the pressurized fluid to actuate the one or more fluid actuators towards a second condition and move the mixing chamber towards the second position.

16. The rotary mixer machine of claim 15, wherein the controller is configured to:

move the first control valve between a first state and a second state, wherein, in the first state, fluid is received by the rod end chamber and is released by the head end chamber to actuate the one or more fluid actuators towards the first condition, and, in the second state, fluid is received by the head end chamber and is released by the rod end chamber to actuate the one or more fluid actuators towards the second condition.

17. The rotary mixer machine of claim 13, wherein the rotary mixer machine includes a tank for storing fluid, a fluid source configured to draw fluid from the tank and provide a pressurized fluid to the one or more second actuators, and a second control valve fluidly coupled between the fluid source and the one or more second actuators.

18. The rotary mixer machine of claim 17, wherein the one or more second actuators include one or more fluid actuators each having a cylinder portion and a rod portion displaceable with respect to the cylinder portion to define a head end chamber and a rod end chamber within the one or more fluid actuators, the rod end chamber receiving the pressurized fluid to actuate the one or more fluid actuators towards a first condition and raise the mixing chamber up to the predefined height threshold with respect to the ground surface, and the head end chamber receiving the pressurized fluid to actuate the one or more fluid actuators towards a second condition and lower the mixing chamber up to a predefined depth threshold with respect to the ground surface, wherein the controller is configured to:

move the second control valve between a first state and a second state, wherein, in the first state, fluid is received by the rod end chamber and is released by the head end chamber to actuate the one or more fluid actuators towards the first condition, and, in the second state, fluid is received by the head end chamber and is released by the rod end chamber to actuate the one or more fluid actuators towards the second condition.

* * * * *